United States Patent [19]

Dysarz

[11] Patent Number: 4,886,288

[45] Date of Patent: Dec. 12, 1989

[54] DEVICE AND METHOD TO SAFELY ELEVATE STABILIZE AND LOWER A WHEEL CHAIR

[76] Inventor: Edward D. Dysarz, 11423 Triola La., Houston, Tex. 77072

[21] Appl. No.: 173,126

[22] Filed: Mar. 25, 1988

[51] Int. Cl.[4] .............................................. B62M 1/14

[52] U.S. Cl. .............................. 280/250.1; 280/364.1; 280/650; 280/657; 280/43.17; 297/347

[58] Field of Search ....... 280/657, 242 WC, 289 WC, 280/43.17, 43.23, 43, 250.1, 650; 248/188.2, 188.5; 297/347, 345, DIG. 4; 292/252; 5/81 R, 63, 64, 65; 254/93 R, 102

[56] References Cited

U.S. PATENT DOCUMENTS

| | | | |
|---|---|---|---|
| Re. 32,242 | 9/1986 | Minnebraker | 297/DIG. 4 X |
| 2,664,143 | 12/1953 | LiCalsi | 297/345 |
| 2,790,484 | 4/1957 | Pollack | 280/47.4 |
| 3,103,384 | 9/1963 | Zivi | 297/347 |
| 3,618,968 | 11/1971 | Greer | 297/DIG. 4 X |
| 3,882,949 | 5/1975 | Anderson | 297/345 X |
| 3,953,054 | 4/1976 | Udden et al. | 297/347 X |
| 3,968,991 | 7/1976 | Maclaren | 280/242 WC X |
| 4,082,349 | 4/1978 | Ballenger | 280/47.4 X |

FOREIGN PATENT DOCUMENTS

| | | | |
|---|---|---|---|
| 133523 | 2/1985 | European Pat. Off. | 297/345 |

*Primary Examiner*—Charles A. Marmor
*Assistant Examiner*—T. Finlay

[57] ABSTRACT

A device and method that will safely elevate a wheel chair to a greater height, hold said wheel chair in a safe elevated position and allow a person confined to said wheel chair to achieve the height of that of a standing person. The feet of the wheel chair are first rotated outward and lowered onto the floor, the wheel chair is then elevated by air pressure to a desired height and locked off for safety. When the wheel chair is being elevated or lowered, it will automatically lock off if the chair becomes unlevel for any reason.

22 Claims, 15 Drawing Sheets

DEVICE AND METHOD TO SAFELY ELEVATE STABILIZE·AND LOWER A WHEEL CHAIR

BACKGROUND OF THE INVENTION

1. Field of the Invention

The present invention relates to the wheel chairs and people that are unable to walk and are therefore confined to their wheel chairs. While a person may be capable of moving around their living quarters or work area on a wheel chair, they are unable to attain sufficient height to reach and work on counter tops, stove tops, cupboard shelves and work benches. The present invention has been found to be particularly useful for persons who are unable to support themselves on their legs or for persons who have no legs at all that must be elevated to standing heights. The present invention however is also useful to persons that are recovering from an illness or persons that are just too weak to stand for even short periods of time without risking a fall.

2. Description of Prior Art

The wheel chair is a useful and indispensable vehicle to move disabled persons from one location to anther. Most people that are unable to walk or stand use a wheel chair during most of their waking hours. Today there are millions of wheel chairs in existence and in constant use.

Although a wheel chair is useful to persons that are unable to walk, it does have some limitations. One limitation to a wheel chair is that generally it has a low elevation or an elevation that allows a person to sit at a table while eating or to sit at a desk. The lower elevation does not give a person confined to a wheel chair the ability to work at a counter top, stove top, oven, work bench or reach a cupboard or a shelf.

In order to reach into a cupboard, a person in a wheel chair, must crawl out of the wheel chair, climb unto the counter top and reach into the cupboard; this is very dangerous and time consuming. If a person that is confined to a wheel chair must work on a counter or work bench, they must climb on to the counter or work bench and sit on the counter or work bench; this is also dangerous and it reduces the efficiency of the disabled person.

There are several types of elevating wheel chairs that have been developed in the past. One type of elevating wheel chair only elevates the seat part of the wheel chair. Another type of elevating wheel chair places disabled person into a standing position.

Two examples of the first type of wheel chair that elevates the seat and back rest of a wheel chair are shown in U.S. Pat. No. 3,882,949 issued to Anderson and U.S. Pat. No. 4,431,076 issued to Simpson. These wheel chairs elevate the disabled person but they do not stabilize the wheel chair as it is elevated. When the wheel chair is elevated with the disabled person, the ability to balance the wheel chair is diminished and the hazard of falling over is increased.

The other type of elevating wheel chair is the type that allows the disabled person to be supported and held in a standing position. This type of elevating wheel chair is shown in U.S. Pat. No. 4,067,249 issued to Deucher; U.S. Pat. No. 4,076,304 issued to Deucher; U.S. Pat. No. 4,598,944 issued to Meyer and Nold. These wheel chairs place the disabled person in a standing position but they do not increase their balance and since they are elevated their balance is greatly decreased again causing a hazardous condition. This type of wheel chair is limited to disabled persons that have the ability to support their body weight on their legs or spine and therefore cannot be used by many disabled persons.

Several other elevating wheel chairs have been known and used before and are typical examples thereof are shown in U.S. Pat. No. 1,307,058 issued to McGrath; U.S. Pat. No. 2,374,182 issued to Duke; U.S. Pat. No. 2,459,066 issued to Duke; U.S. Pat. No. 2,530,544 issued to Schwantes; U.S. Pat. No. 2,546,765 issued to McKinley; U.S. Pat. No. 2,609,862 issued to Pratt; U.S. Pat. No. 2,792,052 issued to Johannesen; U.S. Pat. No. 2,866,495 issued to Diehl et al; U.S. Pat. No. 2,915,112 issued to Schwartz; U.S. Pat. No. 3,905,436 issued to Karchark Jr. et al; U.S. 15 Pat. No. 3,937,519 issued to Schoolden; and U.S. Pat. No. 3,953,054 issued to Udden et al. None of these devices, however, teach the elevating of a wheel chair while increasing the stability of the wheel chair.

SUMMARY OF THE INVENTION

The present invention is a highly efficient device that will allow a person confined to a wheel chair to be safely elevated to the desired height of a standing person thus enabling the person to reach the top of counters, work benches and most shelves and cupboards.

The wheel chair of the preferred embodiment is elevated on four legs that extend from beneath the wheel chair to a position outside of the wheel base of the wheel chair. As the legs extend outward they are also lowered to the floor or ground. When the base of the legs are on the ground, the wheel chair is elevated above the ground to the desired elevation. Once the wheel chair is in the desired elevation it will automatically lock in place for safety. When the wheel chair is to be lowered, the valve on the wheel chair is turned to the lowering position and the wheel chair will be allowed to be lowered.

The wheel chair of the preferred embodiment has two other safety devices. One safety device is a ball stop that will not allow the wheel chair to be elevated or lowered on a sloping surface. If an attempt is made to lower the wheel chair on a sloping surface, the ball stops in and around the legs will lock the legs in place thus preventing the wheel chair from turning over. Another safety device is the safety belt that is composed of a series of flexible tubes with quick connect and disconnect fittings that will allow the person in the wheel chair to connect the fittings after they are in the chair and to disconnect the fittings when they wish to leave the wheel chair. When the safety belt is not fastened, the chair will not be allowed to move up or down.

BRIEF DESCRIPTION OF THE DRAWINGS

For further understanding of the nature and objects of the present invention, reference should be had to the following detailed description of the preferred embodiment thereof, taken in conjunction with the accompanying drawings, in which parts are given like numerals and wherein.

DETAILED DESCRIPTION OF THE PREFERRED EMBODIMENTS

The embodiments of the device and the method of the present invention may be used to elevate a wheel chair that is normally used to transport persons that are unable to walk, to a height relative to a standing person.

The superior elevating ability is accomplished by the use of hydraulic or pneumatic pressure reacting on the two or four cylinders that form the four legs of the elevating wheel chair. As air or fluid is forced into the cylinders, the pistons push the rods onto the floor and further cause the wheel chair to elevate.

Another object of the invention is to provide a safe base on which the wheel chair is to be elevated on.

Still another object of the invention is to provide a locking means that will safely hold the wheel chair in place as it is being elevated.

Yet another object of the invention is to provide a means to prevent the wheel chair from being elevated or lowered on an unleveled plane.

Yet another object of the invention is to provide a safety belt that will allow the wheel chair to be elevated or lowered only when fastened but will not allow the wheel chair to move when disconnected.

The preferred embodiment and the other embodiments place more emphasis on elevating a wheel chair but safety and the safety devices are equally important to the invention.

DEVICE AND ITS METHOD OF USE

Figure 1:
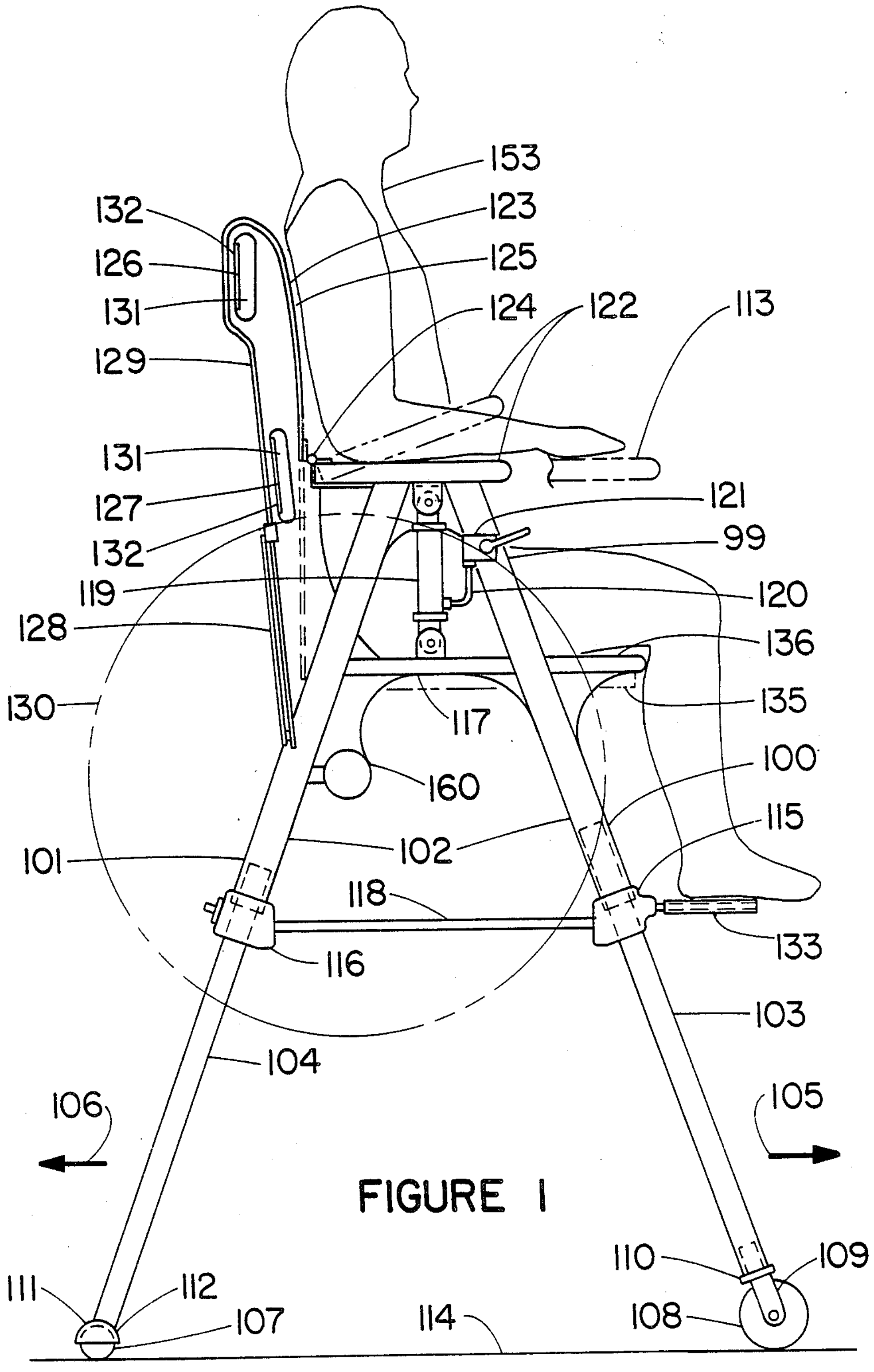
FIG. 1, is a side elevation of the wheel chair of the preferred embodiment shown in an elevated position.

Referring to FIG. 1 there is shown the preferred embodiment of the present invention. The wheel chair 99 is shown supporting a disabled person 153 on and above the floor 114. The wheel-chair 99 is shown elevated. The front cylinder 100 and the rear cylinder 101 are both sloping to form an A frame 102.

The A frame 102 configuration has several major advantages over the other wheel-chair designs. The A frame 102 forms a more rigid structure with fewer components and therefore has less weight. The A frame 102 configuration will allow the front leg 103 to move forward 105 and the rear leg 104 will also move rearward 106 as the wheel-chair 99 is elevated, thus placing the rear elevating roller ball 107 and the front wheel 108 at a greater distance apart. When the rear elevating roller ball 107 and the front wheel 108 are a greater distance apart, the wheel chair 99 will have greater balance.

The front wheel 108 on the wheel-chair 99 is shown suitably supported on the front wheel fork 109 which is suitably fastened to the front leg 103 with bearings 110 that will allow the front wheel fork 109 to rotate.

At the lowermost end of the rear leg 104 is the rear elevating roller ball 107 that is designed to roll in any direction. The rear elevating roller ball 107 is held to the rear leg 104 by a socket 112 that is made of a suitable material that has a low friction coefficient. The socket 104 is held in place by an outer shell 111 that is made of graphite or steel or some other suitable strong material. The outer shell is suitably fastened to the rear leg 104. Other types of suitable wheels or rollers etc. could be used on the rear legs 104 that allow the rear legs 104 to move in the necessary direction.

Figure 11:
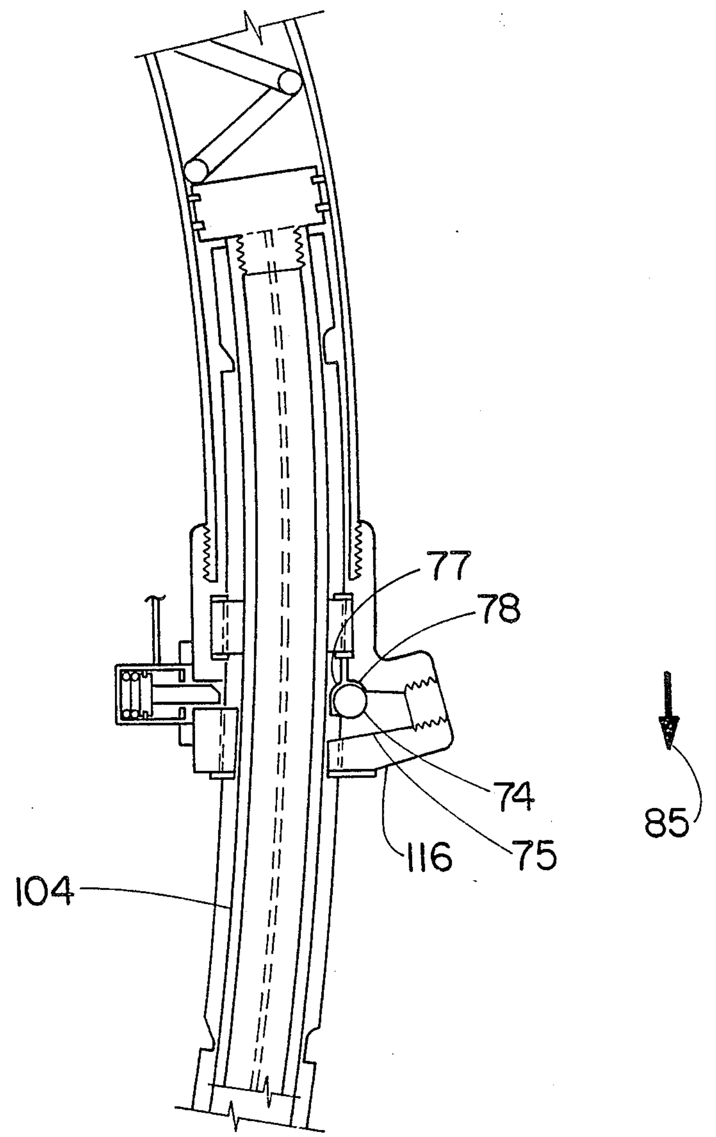
FIG. 11, is an enlarged section elevation of the preferred embodiment taken from FIG. 9, showing the mechanical details of the apparatus while on an unsafe slope.
Figure 12:
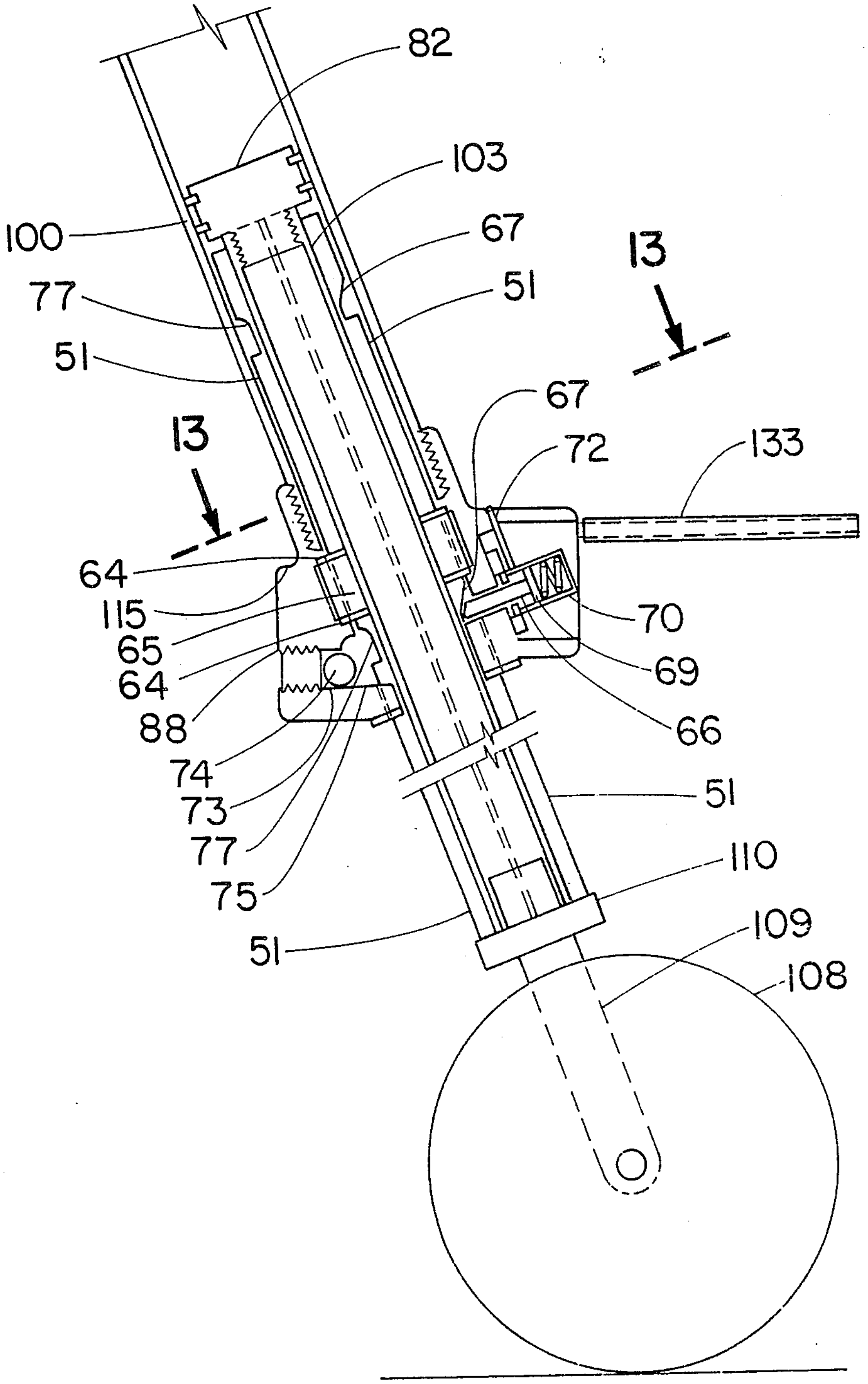
FIG. 12, is an enlarged section elevation of a front wheel of the wheel chair of the preferred embodiment.
Figure 13:
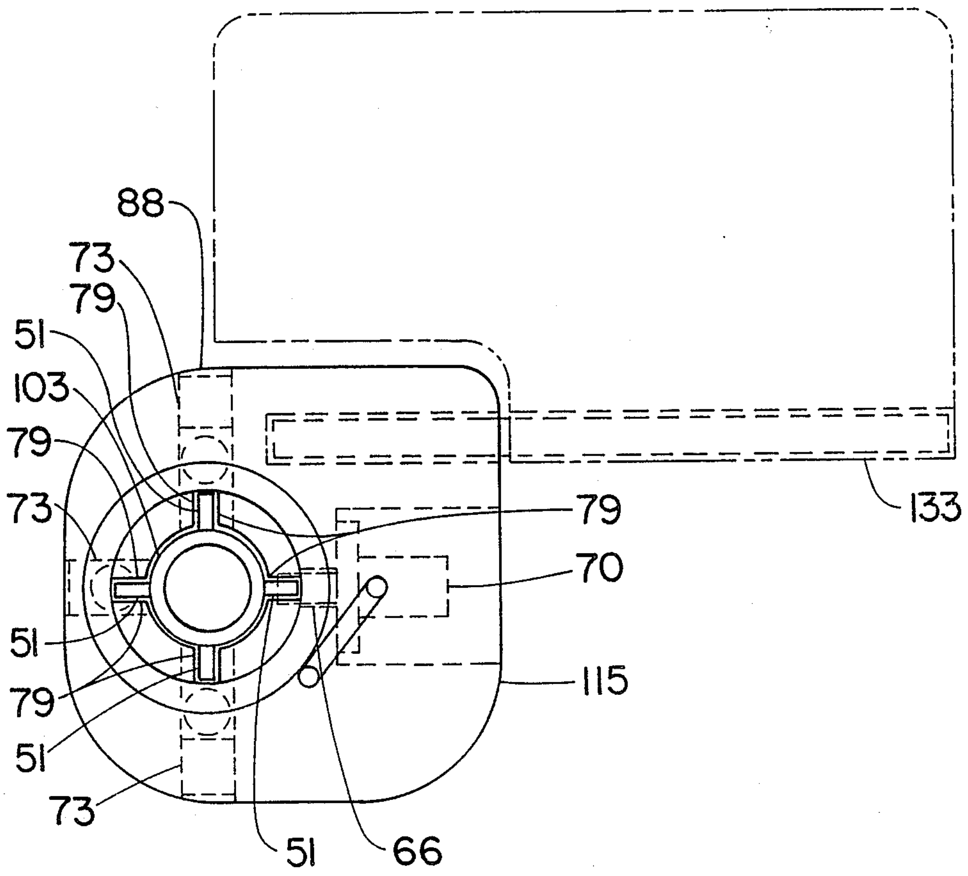
FIG. 13, is a section plan view taken through FIG. 12.

At the lowermost end of the front cylinder 100 is the front latch housing 115 which is shown in greater detail in FIGS. 12 and 13. The front latch housing 115 is shown supporting the foot rest 133. At the base of the rear cylinder is the rear latch housing 116 which will also be shown in FIGS. 8, 9, 10, 11, 14 and 15.

The rear wheel axle housing 160 that supports the rear wheel 130 is shown suitably attached to the rear cylinder 101 by various bars and braces. Also suitably fixed to the rear cylinder 101 and the front cylinder 100 is the seat support member 117 and the lower brace 118 which braces the rear cylinder 101 and the front cylinder 100. These members form a A frame and also form the outer vertical and horizontal periheries of a chair.

Also fastened to the seat support member 117 is the pump 119. The pump 119 has a flexible tube 120 suitably fastened to it. The flexible tube 120 carries air pressure from the pump 119 to the manifold 121. The air pressure is disturbed from the manifold 121 to the various cylinders by tubes not shown. The pump 119 is further suitably fastened to the backrest support 123 by a hinge 124 that will alloW the right arm rest 122 to swing up and down in order to operate the pump 119.

Figure 5:
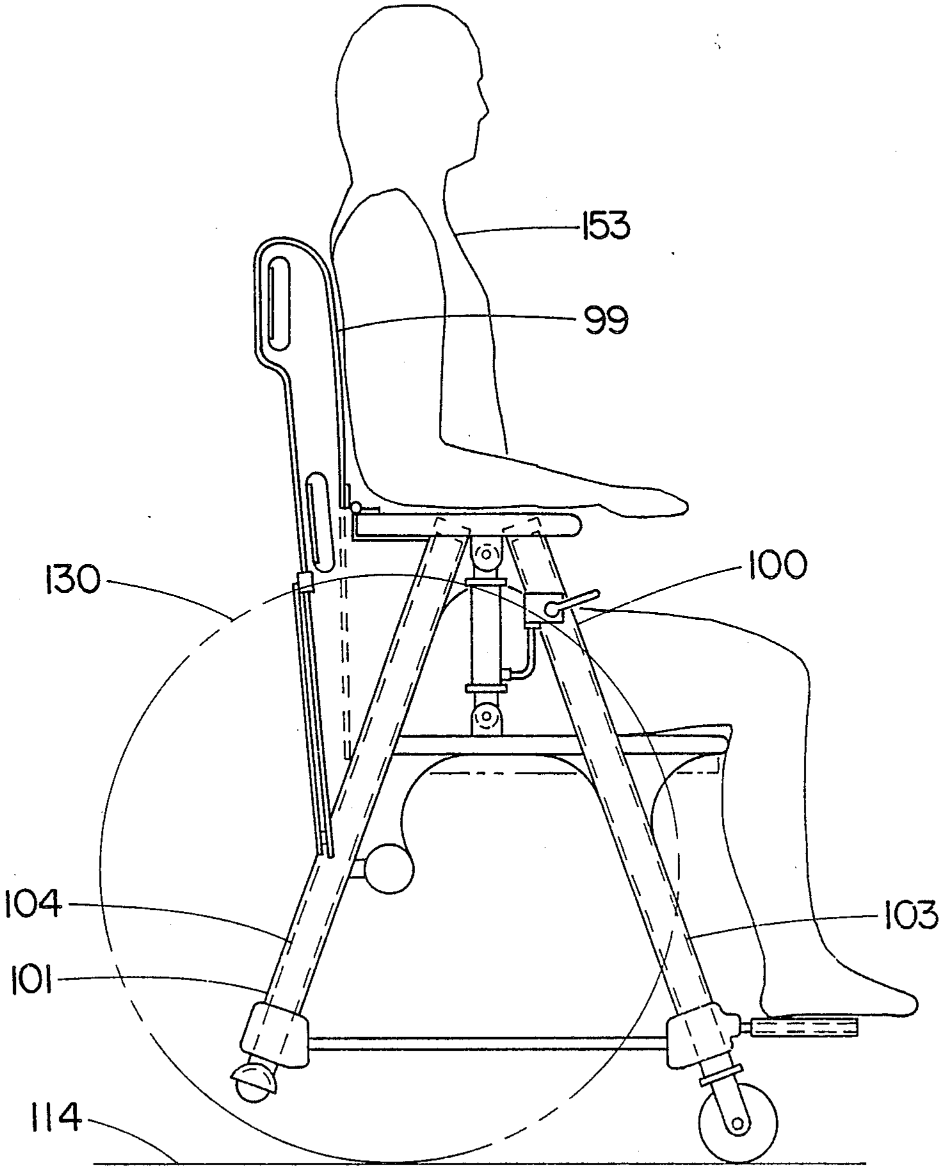
FIG. 5, is a side elevation of the wheel chair of the preferred embodiment shown in a lowered position.

The backrest support 123 is suitably fastened to the rear cylinder 101. The backrest support 123 is also shown with a curve 125 that will conform to the curvature of the spine of the person that will use the wheel chair 99. The backrest support 123 is made out of graphite but it could also be made out of wood, fiberglass, metal or some other suitable material. The backrest support 123 is shown with an upper handgrip 126 and a lower handgrip 127. The upper handgrip 126 and lower handgrips 127 are cutouts 131 in the back rest support 123 with finger pads 132 suitably fastened to the backrest support 123 to allow the backrest to be gripped and push the wheel chair 99. The upper handgrips 126 are used to grip and move the wheel chair 99 when the wheel chair 99 is in a lowered position as is shown in FIG. 5. The lower handgrip 127 is used to grip and move the wheel chair 99 when the wheel chair 99 is in a elevated position as shown.

The right arm rest 122 is shown recessed to allow the wheel chair 99 to move close to a table etc., but the right arm rest 122 could also be made with an extendable arm rest 113. The extendable arm rest can be extended when necessary and can be retracted when necessary.

The seat 135 of the wheel chair 99 is shown with phantom lines. The seat 135 is suitably fastened to the seat support member 136 and seat support member 117.

A side view of the sliding X brace 128 is shown slideably fastened to the backrest flange 129 of the backrest support 123. The sliding X brace 128 will be further explained in FIG. 3.

The A frame 102 also includes the seat support members 117 and 136, the lower brace 118 the arm rest 122 and the sliding X brace 128.

Figure 2:
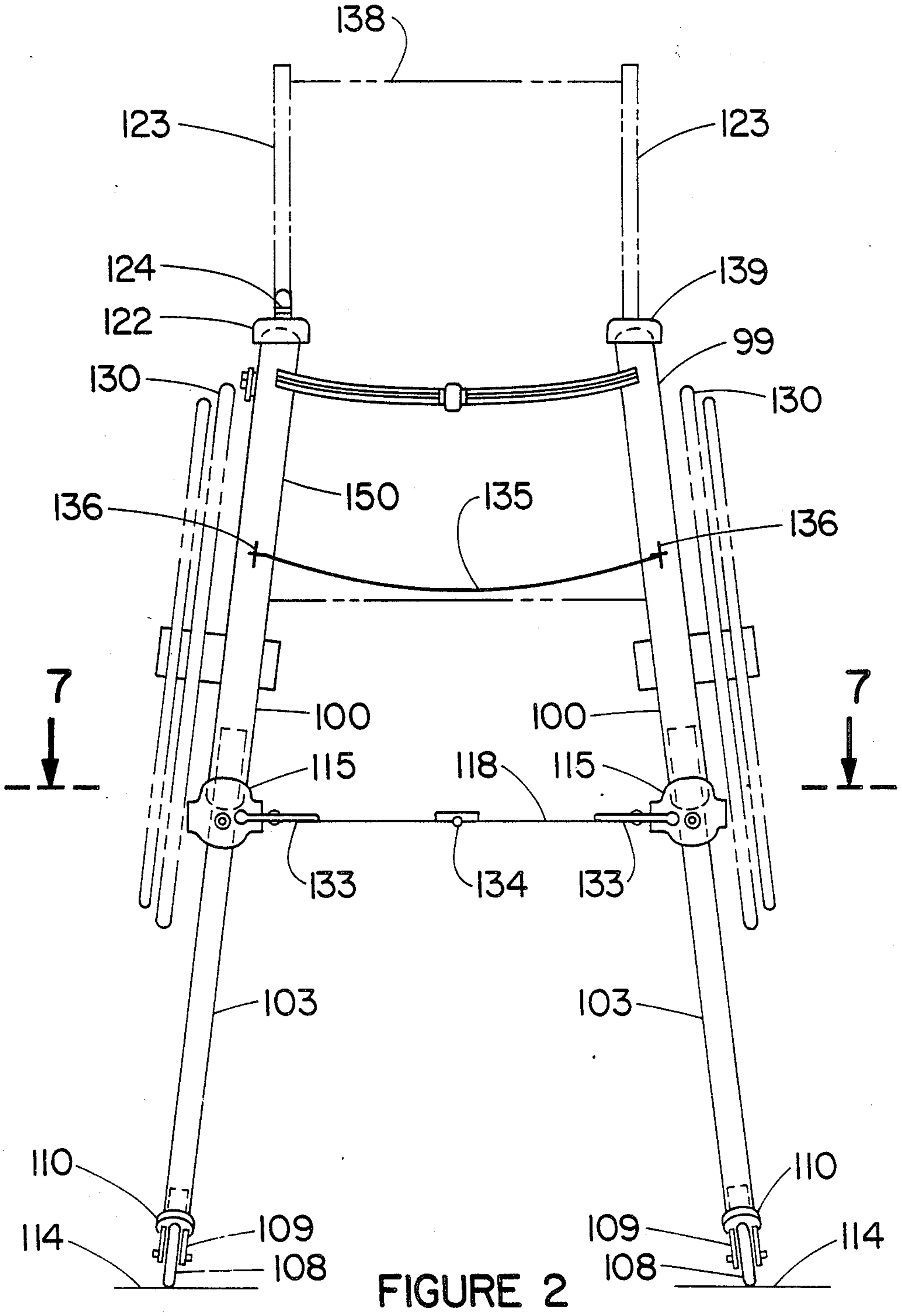
FIG. 2, is a side elevation of the wheel chair of the preferred embodiment shown looking toward the back of said wheel chair.

Referring to FIG. 2 there is shown a frontal elevation of the wheel chair 99 of the preferred embodiment looking in a rearward direction. The wheel chair 99 is shown in an elevated position.

The front wheels 108 are shown on the floor 114. The front legs 103 are resting on the front wheel forks 109 and the bearings 110. Near the top of the front legs 103 are the front latch housings 115 which are sufficiently fastened to the lower end of the front cylinders 100. The front cylinders 100 are part of frame 150 of the wheel chair 99.

The foot rest 133 is shown suitably fastened to the front latch housings 115 Also shown is the lower brace 118 that is suitably fastened to the front latch housings 115. The lower brace 118 has a center hinge 134 that will allow the lower brace 118 to fold up when the wheel chair is folded up for storage purposes as will further be explained in FIG. 6.

The seat 135 is shown fastened to the seat support member 136. The seat 135 could be made up of leather or other suitable material that will support the weight of a person. Also shown is the seat belt 137 that is the same as the seat belt of the preferred embodiment.

The back rest 138 is shown supported by the backrest support 123. The back rest 138 and backrest supports 123 are shown with phantom lines because they are in the rear of the wheel chair 99.

The right arm rest 122 is shown with a hinge 124 and the left arm rest 139 is shown without a hinge.

The front cylinders 100 and the front legs 103 are shown on a slope. The slope causes the front wheels 108 to move outward as the wheel chair 99 is elevated thus giving the wheel chair 99 greater balance when it is elevated.

Figure 6:
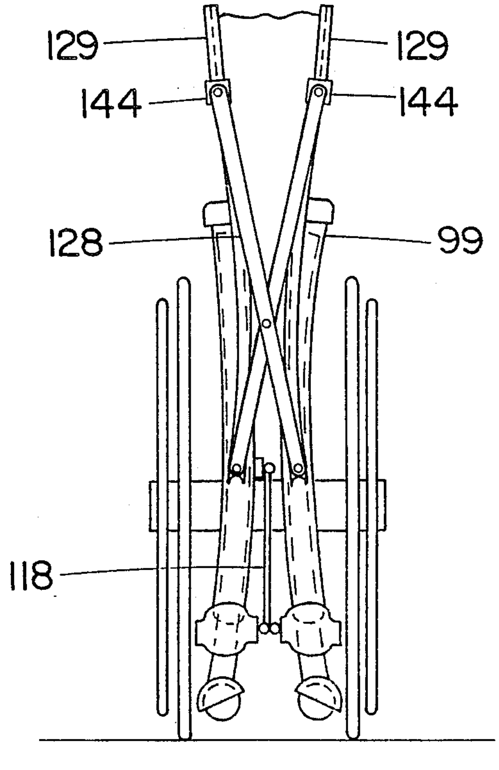
FIG. 6, is an front elevation of the wheel chair of the preferred embodiment showing said wheel chair in a folded position.

The rear wheels 130 are shown with the same slope of the front cylinders 100 and the front legs 103 to allow the wheel chair 99 to take up less space when it is folded up as shown in FIG. 6. The rear wheels 130 could however, be vertical.

Figure 3:
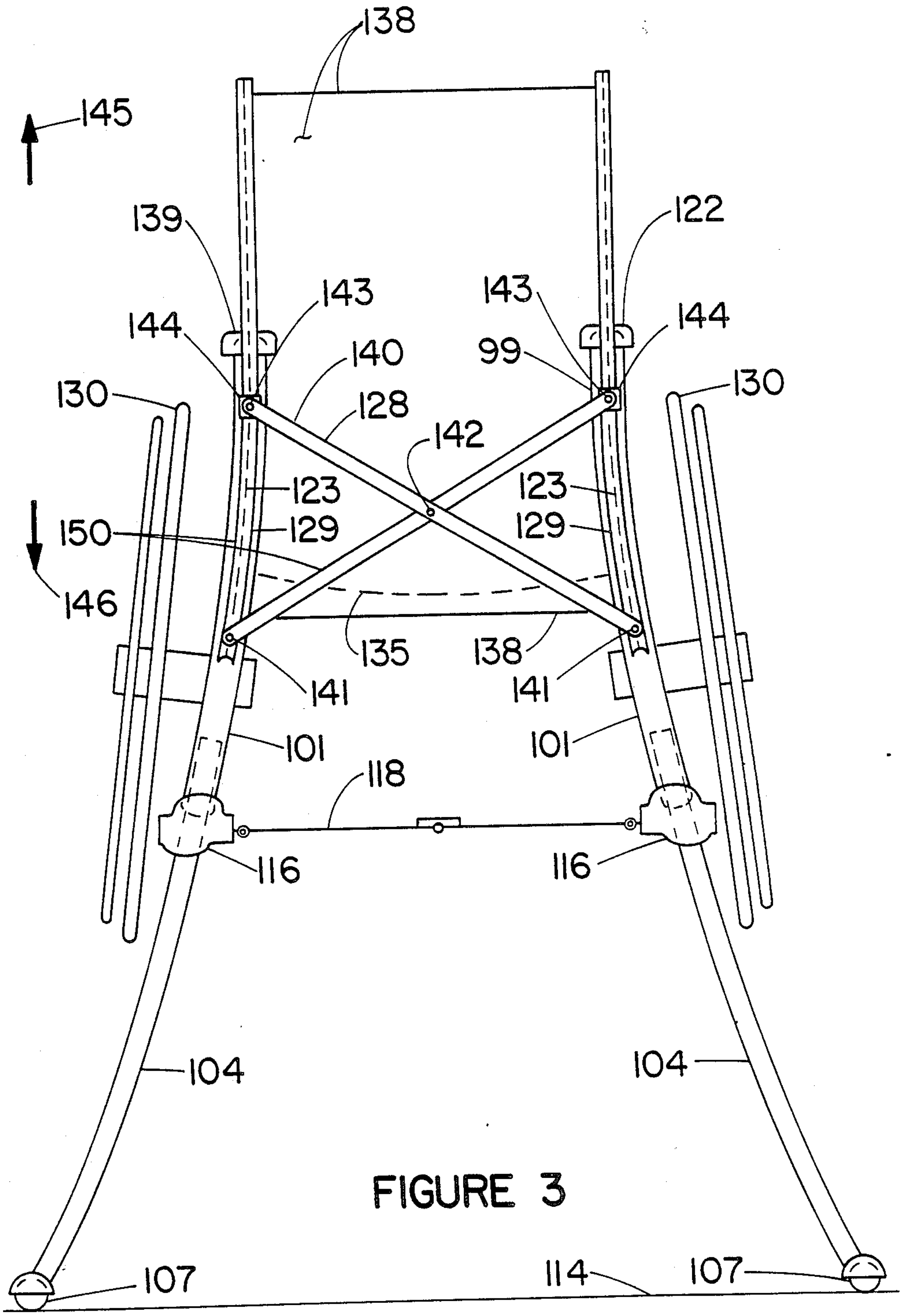
FIG. 3, is a rear elevation of the elevation wheel chair of the preferred embodiment shown looking toward the front of said wheel chair.

Referring to FIG. 3 there is shown a rear elevation of the elevated wheel chair 99, shown looking toward the front of the wheel chair 99.

In this view the rear legs 104 and the rear cylinders 101 are shown as being curved. The curve in the rear leg 104 is to cause the rear legs 104 to move outward from the wheel chair 99 as the wheel chair 99 is being elevated thus giving the wheel chair 99 greater stability when elevated.

The rear elevating roller balls 107 that are suitably fastened to the rear legs 104 will allow the rear legs 104 to move outward on the floor 114 in any direction as the wheel chair 99 is elevated.

The lower brace 118 is shown fastened to the rear latch housing 116 thus reducing the spreading forces on the rear cylinders 101 that could result when the wheel chair 99 is elevated.

Also shown in FIG. 3 is the sliding X brace 128. The sliding X brace 128 is composed of two bars 140 that form an x. The bars 140 are shown fastened near the lower end of the back rest flange 129 with a pin 141 that will allow the bars 140 to rotate. The bars 140 are also joined together near the center by another pin 142 that will also allow the bars 140 to rotate. At the top of the bars 140 there is still another pin 143 that fastens the bars 140 to the slide guides 144. The slide guides 144 are slideably fastened to the bracket flanges 129 and slide in an upward direction 145 as the wheel chair 99 is being closed or in a downward direction 146 as the wheel chair 99 is being opened. The sliding x brace 128 stabilizes the wheel chair 99 and makes up part of the frame 150 of wheel chair 99.

The back rest 138 is shown suitably fastened to the backrest support 123. The outline of the seat 135 is also shown with hidden lines. The right arm rest 122 and the left arm rest 39 are shown at the top of the rear cylinders 101. The rear wheels 130 are also shown sloping.

Figure 4:
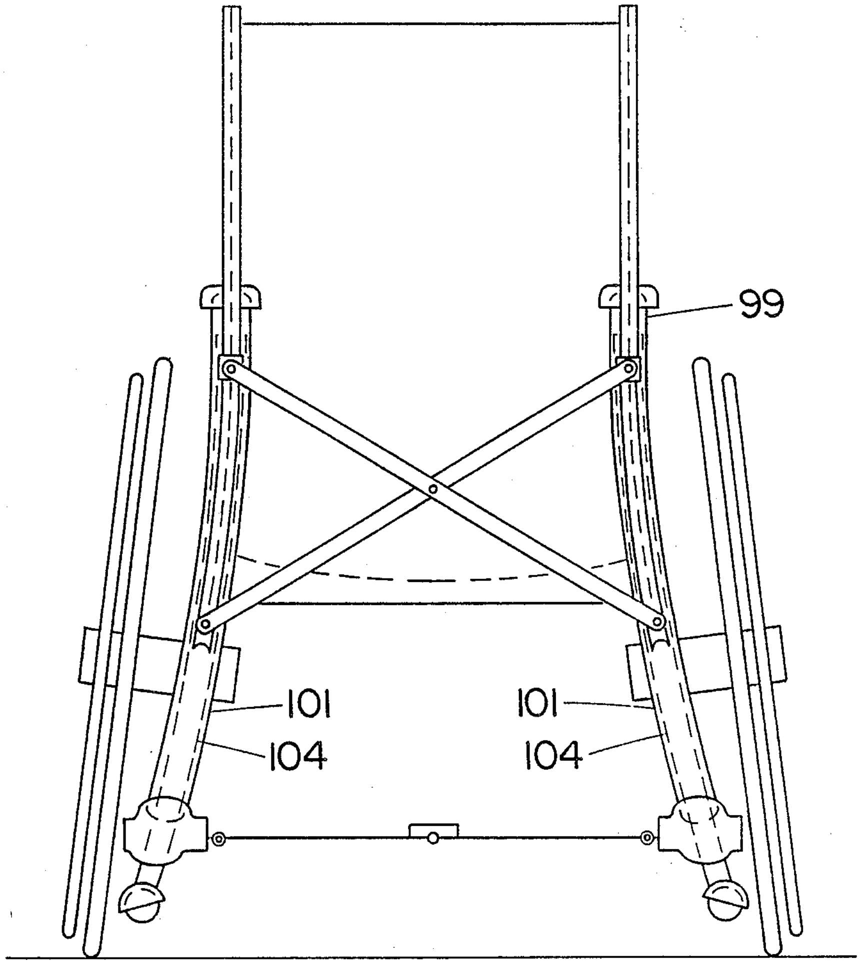
FIG. 4, is a rear elevation of the lowered wheel chair of the preferred embodiment shown looking toward the front of said wheel chair.

Referring to FIG. 4 there is shown a rear elevation of the wheel chair 99 in a lowered position. The rear elevation is shown looking toward the front of the wheel chair 99.

The rear legs 104 are shown mostly inside of the rear cylinder 101. The reason why the rear cylinder 101 is curved, is to allow the curved rear legs 101 to fit inside of the rear cylinder 104.

All of the other parts of the wheel chair 99 of FIG. 4 are the same as those shown in FIG. 3.

Referring to FIG. 5 there is shown a side elevation of the wheel chair 99 in a lowered position. The wheel chair 99 is shown supporting a disabled person 153 on and above the floor 114.

The front leg 103 is inside of the front cylinder 10 and the rear leg 104 is inside of the rear cylinder 101. The rear wheel 130 and the front wheel 108 are shown on the floor 114, supporting the A frame 102 and the wheel chair 99. All other items are the same as that shown in FIG. 1.

Referring to FIG. 6 there is shown a rear elevation view of the wheel chair 99 in a folded position.

The sliding X brace 128 is shown closed. The slide guides 144 are shown moved up along the backrest flange 129 thus allowing the wheel chair 99 to be folded for storage purposes. The lower brace 118 is also shown folded upward.

Figure 7:
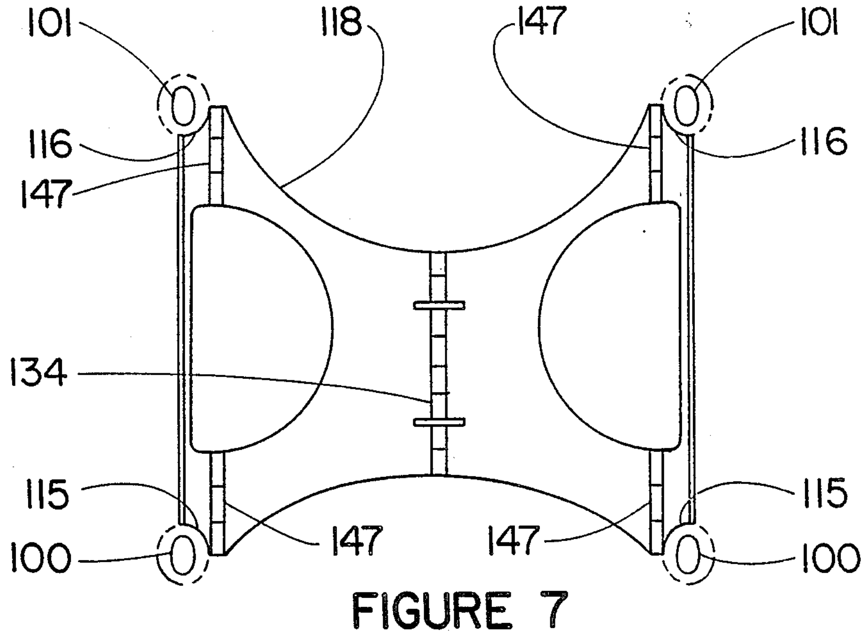
FIG. 7, is a section plan of the lower brace as taken through FIG. 2.

Referring to FIG. 7 there is shown a section plan view of the lower brace as taken through FIG. 2. The lower brace 118 is shown suitably fastened to the front latch housings 115 and the rear latch housings 116.

There are three sets of hinges shown. The center hinges 34 and the side hinges 147 allow the lower brace 118 to fold when the wheel chair is folded up for storage but still brace the front cylinders 100 and the rear cylinders 101 when the wheel chair is opened and or elevated.

Figure 8:
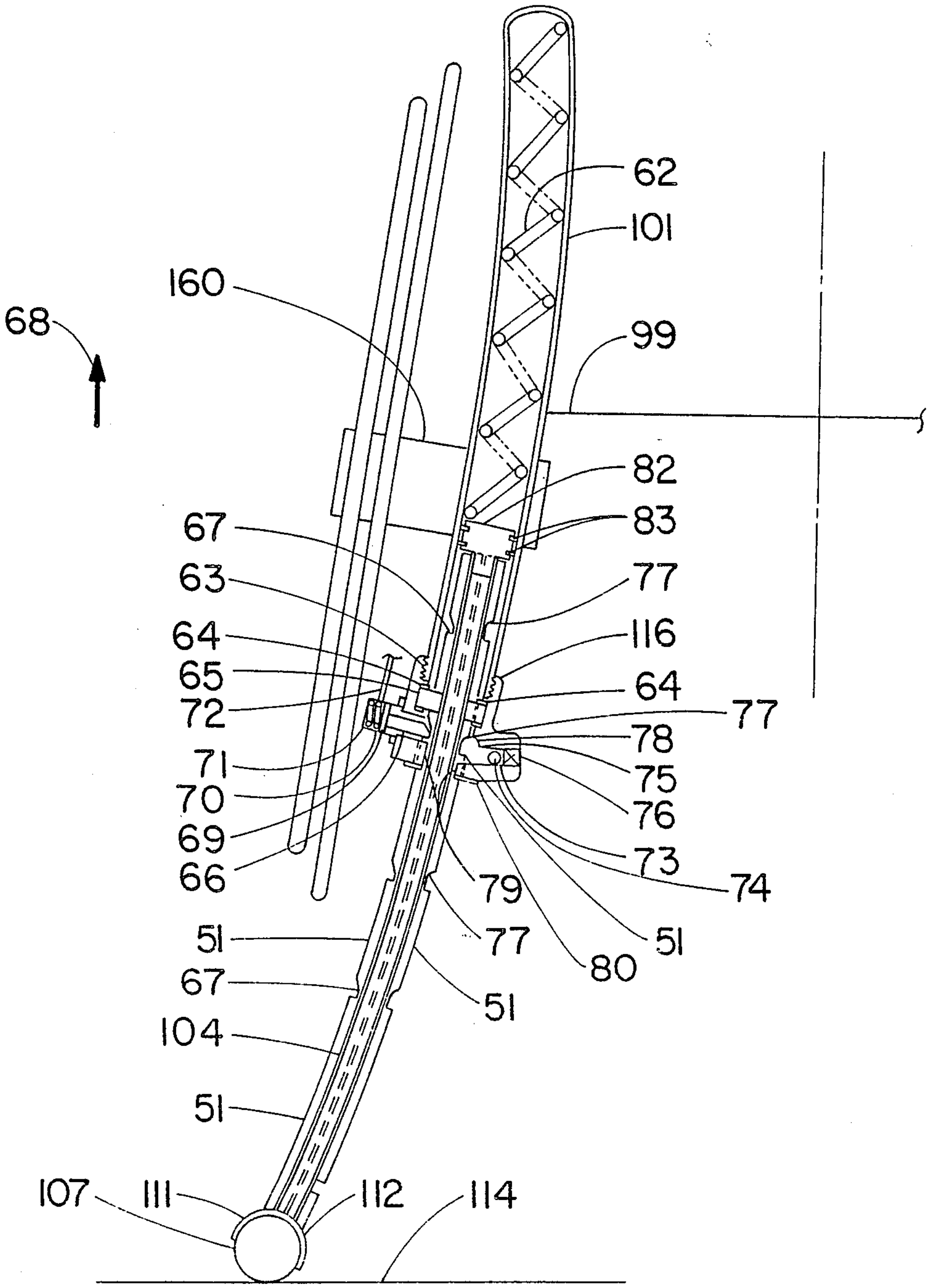
FIG. 8, is a section elevation of the preferred embodiment showing the details of the elevating means and the safety devices.

Referring to FIG. 8 there is shown a section elevation of the rear cylinder 101 and the rear latch housing 116. Although the rear cylinder 101 is shown in detail in FIG. 8 it should be noted that the front cylinders 100 are essentially the same.

The rear elevating roller ball 107 is shown setting firmly on the floor 114. The wheel chair 99 is in a elevated position. Part of the weight of the wheel chair 99 and its contents is bearing down on the rear leg 104.

The four splines 51 are shown more clearly on the rear leg 50. Three of the splines 51 are on the rear leg 104 for safety which will be further explained later, the forth spline 51 is for elevating means and for holding means. Another purpose of the splines 51 is to allow the rear legs 104 to be guided as they move up and down relative to the wheel chair 99.

The rear cylinder 101 is shown with a spring 62 inside. The purpose of the spring 62 is to assist in elevating the wheel chair 99. The spring 62 is shown bearing down on the elevating piston 82. The elevating piston 82 has piston seals 83 wrapped around the elevating piston 82. The piston seals 83 are packers or rings that form an air-tight seal between the elevating piston 82 and the inside of the rear cylinder 101. The elevating piston 82 is suitably fastened to the rear leg 104. When the rear cylinder 101 is suitably pressurized with air pressure, the air pressure will force the elevating piston 82 down relative to the wheel chair 99 which will cause the wheel chair 99 to move in an upward direction 68. The elevating piston 82 is suitably fastened to the top of the rear leg 104.

At the lower end of the rear cylinder 101 is the rear latch housing 116. The rear latch housing 116 is suitably fastened to the rear cylinder 101 by threads 63 or by some other suitable means. Below the threaded connection is a washer 64 and below the washer 64 is a packer 65. The packer 65 is made of a soft rubber of soft plastic and forms an air tight seal around the rear leg 104, splines 51 and the inside wall of the rear latch housing 116. Below the packer 65 is another washer 64. The washers 64 support the packer 65 and allow the packer 65 to rotate freely within the rear latch housing 116.

Below the packer 65 is the latch bar 66. The latch bar 66 is a device that slides into the latching notches 67 as the wheel chair 99 moves in an upward direction 68. One end of the latch bar 66 is shaped to slide into the latching notches 67 and support the wheel chair 99 while in an elevated position. At the other end of the latch bar is a latch piston 69. The latch piston 69 is contained in an air tight latch cylinder 70. The air tight latch cylinder 70 is suitably fastened to the rear latch housing 116.

The latch cylinder 70 is a pneumatic cylinder. On one end of the inside of the latch cylinder 70 is a latch spring 71. The latch spring 71 pushes against the latch cylinder 70 and one end, and the latch piston 69 on the other end. The latch spring 71 forces the latch piston 69 and the latch bar 66 into the latching notch 67 at all times. In order to withdraw the latch bar 66 from the latching notch 67, pneumatic pressure must be applied from the air line 72. The pneumatic pressure must be sufficient enough to overcome the force of the latch spring 71. When the pressure is great enough, it will push the latch piston 69 into the latch spring 71 and thereby push the latch bar 66 back and out of the latch notch 67.

Almost directly across the rear latch housing 116 from the latch bar 66 is the ball stop 73. The ball stop 73 is a safety device that will prevent the wheel chair 99 from moving up or down if it becomes unstable, or if it is on an unleveled surface.

The ball stop 73 consists of a ball 74 that is inside of a ball cylinder 75. The ball cylinder 75 is drilled or cut into the rear latch housing 116. The axis of the ball cylinder 75 is set at more than one (1) degrees off of horizontal or level. The ball 74 is held inside of the ball cylinder 75 and will rest against the plug 76 when the wheel chair 99 is on a level surface. At the other end of the ball cylinder 75 is a spline 51 with stop notches 77 cut into it. At the top portion of the ball cylinder 75 located near the spline 51 is a ball notch 78 which is similar to the shape of the ball bearing 74 but slightly greater in diameter.

Below the ball cylinders 75 and the latch bar 66 are the leg guides 79. The leg guides 79 are slots cut into the rear latch housing 116. The leg guides 79 allow the splines 51 and rear leg 104 to move vertically while controlling the rotation of the rear leg 104.

Below the leg guides 79 is a wiper blade 80. The wiper blade 80 is a rubber strip or some other suitable material that cleans the rear leg 104 and splines 51 as they move up and down.

Although the specifications of FIG. 8 pertain to a rear latch housing 116 and a rear cylinder 101 of the wheel chair 99 they are also applicable to the front latch housing 115 and the front cylinder 100. The details of FIG. 8 are enlarged for clarity in FIG. 10.

Figure 9:
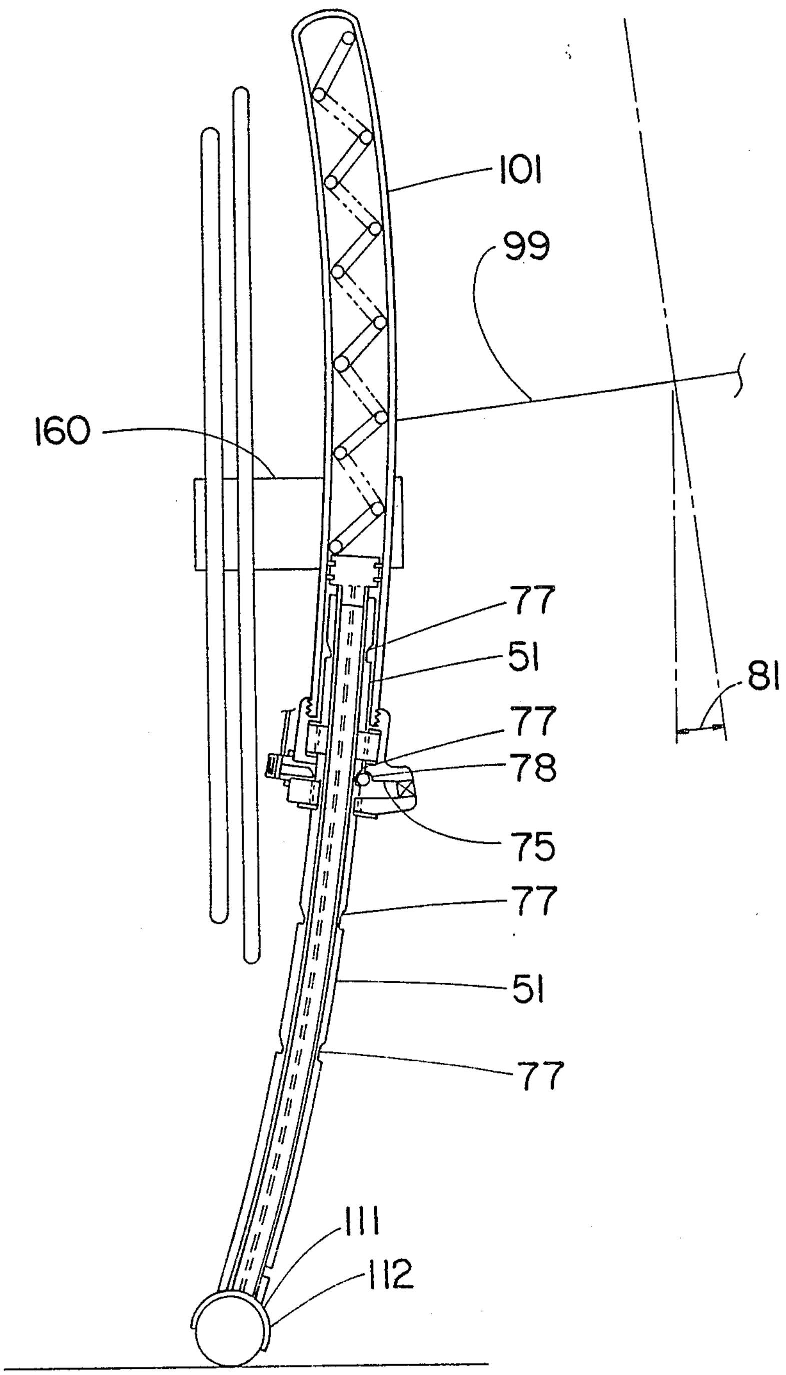
FIG. 9, is a section elevation of the preferred embodiment showing the details and function of the apparatus while the apparatus is operating on an unsafe slope.

Referring to FIG. 9, there is shown the rear cylinder 101 on a greater slope 81. The slope 81 could be caused by the wheel chair 99 being lowered when a front leg accidently locks up and will not lower the wheel chair 99. An uneven slope 81, will result.

As the wheel chair 99 slopes 81 in one direction the ball cylinder 75 will slope toward the spline 51 and the stop notch 77. This slope will cause the ball 74 to roll into the stop notch 77 and be caught between the stop notch 77 and the ball notch 78 thereby causing the ball 74 to lock up the stop notch 77 and the ball notch 78 thus preventing the rear vertical cylinder 17 and the wheel chair 99 from further descending until the slope 81 is removed or corrected. The slope 81 can be removed by elevating the rest of the wheel chair 99 until it is level.

Figure 10:
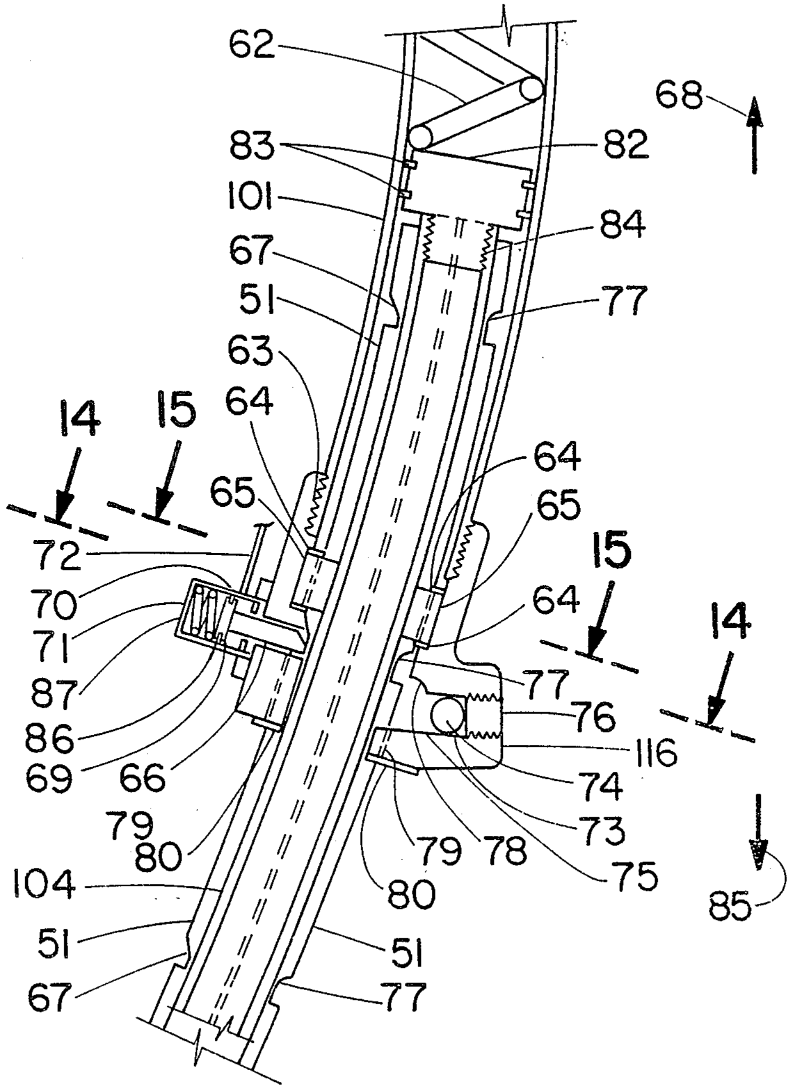
FIG. 10, is an enlarged section elevation of the preferred embodiment, taken from FIG. 8, showing the mechanical details of the apparatus.

Referring to FIG. 10 there is shown an enlarged section elevation of the rear latch housing 116 part of the rear leg 104 and the lower part of the rear cylinder 101.

The rear cylinder 101 is shown fastened to the rear latch housing 116 by threads 63 but welding or other suitable means could be used. The lower part of the spring 62 is shown pushing down on the elevating piston 82. The elevating piston 82 has piston seals 83 wrapped around it to form an air tight seal between the rear cylinder 101 and the elevating piston 82.

The elevating piston 82 is fastened to the rear leg 104 by threads 84 or other suitable means not shown. Suitably fastened to the rear leg 104 are the splines 51. One spline 51 has latching notches 67 cut into it. The latching notches 67 are for the latch bar 66 to support the weight of the wheel chair 99 and its contents. On the other side of the spline 51 with the latching notches 67 is another spline 51 with stop notches 77 cut into it. The stop notches 77 are part of the safety system that will prevent the wheel chair from turning over.

The rear latch housing 116 is shown fastened to the bottom portion of the rear cylinder 101. Directly below the rear cylinder 101 and inside of the rear latch housing 116 is a washer 64. The washer 64 is used to retain the packer 65. There, is another washer 64 at the lower most end of the packer 65 which also is used to retain the packer 65. The two washers 69 will allow the packer 65 to rotate some as the rear leg 104 rotates. The rear packer 65 forms an airtight seal between the rear leg 104, the spline 51 and the rear latch housing 116.

Below the rear packer 65 is the latch bar 66. The latch bar 66 is shown inserted into a latching notch 67 in the spline 51. The latch bar 66 is forced or pushed into the latch notch 67 by the latch spring 71. If the wheel chair 99 is moving in an upward direction 68, the latch bar 66 is so sloped on the end to cause it to push against the slope of the latching notch 67 and it will thus be pushed back. If the wheel chair 99 is moving in a downward direction 85 the latch spring 71 will hold the latch bar 66 in the latching notch 67 thus preventing movement in a downward, direction 85. To move in a downward direction 85 pressure must be applied to the latch cylinder 70 through the air line 72 thus pushing on the latch piston 69 with sufficient force to overcome the force of the latch spring 71. The latch piston 69 has a piston seal 86 around it to form an air tight seal between the latch cylinder 70 and the latch piston 69. Any air trapped between the latch piston 69 and the latch cylinder 70 will be vented through the latch orifice 87.

Across from the latch bar 66 is the ball stop 73 which is a safety device that will prevent the wheel chair 99 from tipping over under various unsafe conditions.

The ball stop 73 consists of a ball cylinder 75 formed in part of the rear latch housing 116. The ball cylinder 75 is formed on a slight angle slopping away from the rear leg 104 when the rear leg 104 is level relative to a level surface. At one end of the ball cylinder 75 is a plug 76 that is threaded into the ball cylinder 75. The plug 76 retains the ball 74 in the ball cylinder 75. At the other end of the ball cylinder 75 is the ball notch 78. The ball notch 78 is a round notch with a circumference that is slightly greater than that of the ball 74.

Below the latch bar 66 and the ball stop 73 are the leg guides 79. The leg guides 79 are short cuts into the lower most portion of the rear latch housing 116. The splines 51 pass through the leg guides 79 but the leg guides prevent the rear leg 104 from rotating.

Below the leg guides 79 are the wiper blades 80. The wiper blades 80 wipe off dirt from the rear legs 104 and the splines 51 as the wheel chair 99 is moved up and down.

Referring to FIG. 11 there is shown an enlarged section elevation of the wheel chair 99, the rear latch housing 116, and the rear leg 104 in an unsafe slope.

The cause of the slope could have been due to something leaning on the wheel chair 99 as it was being lowered thus causing it to lean in one direction. As the slope of the wheel chair 99 is increased, the slope of the ball cylinder 75 is reversed from away from the direction of the rear leg 104 to slope in the direction of the rear leg 104 when the slope changes, the ball 74 will roll toward the rear leg 104 and will thus get caught in one of the stop notches 77 that is cut into the spline 51. When this happens, the ball 74 will lock itself into the stop notch 77 and the ball notch 78 thus preventing the wheel chair to continue moving in a downward direction 85 on that particular leg and further preventing the wheel chair from tipping over.

Referring to FIG. 12, there is shown a section elevation of the front latch housing 115 and the lower part of the front cylinder 100 of the wheel chair 99.

All of the elements that make up the rear latch housing etc. are equal and opposite in the front latch housing.

The front leg assembly 88 has an elevating piston 82 fastened to the front leg 103. The front leg 103 has splines 51 suitably fastened to it. The spline 51 on one side has latching notches 67 cut into it and the splines 51 on the other three sides have stop notches 77 cut into them. The latch bar 66 has a latch piston 69 inside of a latch cylinder 70 backed up by a latch spring. An air line 72 supplies air pressure to move the latch bar 66 in and out. There are two washers 64, one on the top of the packer 65 and the other at the bottom of the packer 65. On the other side of the front cylinder 100 is the ball stop 73 with the ball 74 inside of the ball cylinder 75. The front leg assembly 88 is also shown supporting the foot rest 123.

Referring to FIG. 13 there is shown a section plan view of the front leg assembly 88 as taken through FIG. 12.

The front leg 103 is shown with four (4) splines 51 fastened to it. The leg guides 79 are shown around the splines 51. The latch cylinder 70 is shown with hidden lines. The ball stops 73 are also shown in hidden lines. The front latch housing 115 is shown supporting the foot rest 133 on one side.

Figure 14:
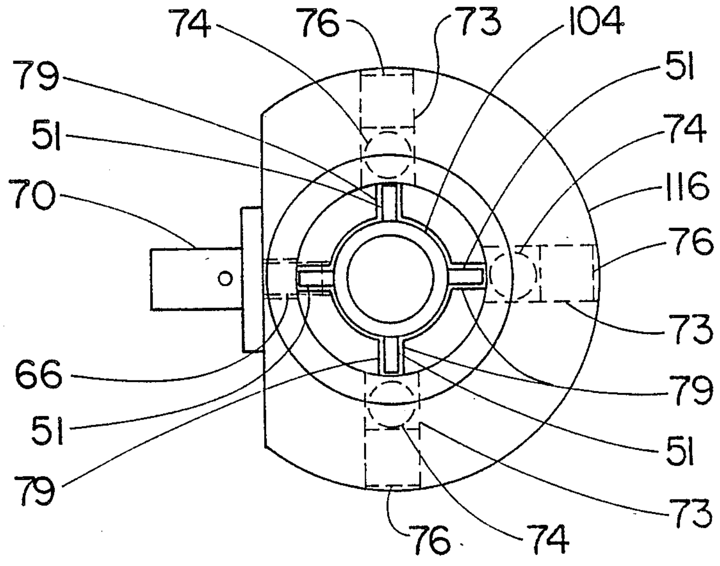
FIG. 14, is a section plan view taken through FIG. 10.

Referring to FIG. 14 there is shown a section plan view of the rear latch housing 116 as taken through FIG. 10.

The rear leg 104 is shown with four (4) splines 51 fastened to it. On one spline 51 there is shown the latch bar 66 and the latch cylinder 70. On the other three splines 51 there is shown three ball stops 73, with the ball 74 at rest aagainst the plugs 76. The leg guides 79 are shown as slots cut in way of the splines 51.

Figure 15:
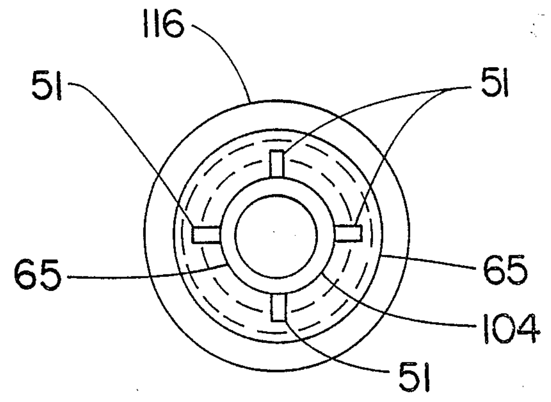
FIG. 15, is a section plan view taken through FIG. 10.

Referring to FIG. 15 there is shown a section plan view of the upper part of the rear latch housing 116 as taken through FIG. 10.

The rear leg 104 is shown with four spines 51 fastened to it. The packer 65 is shown tightly compressed around the rear leg and spplines 51 forming an airtight packer 65 between the rear leg 104, the splines 51 and the inside of the rear latch housing 116.

Figure 16:
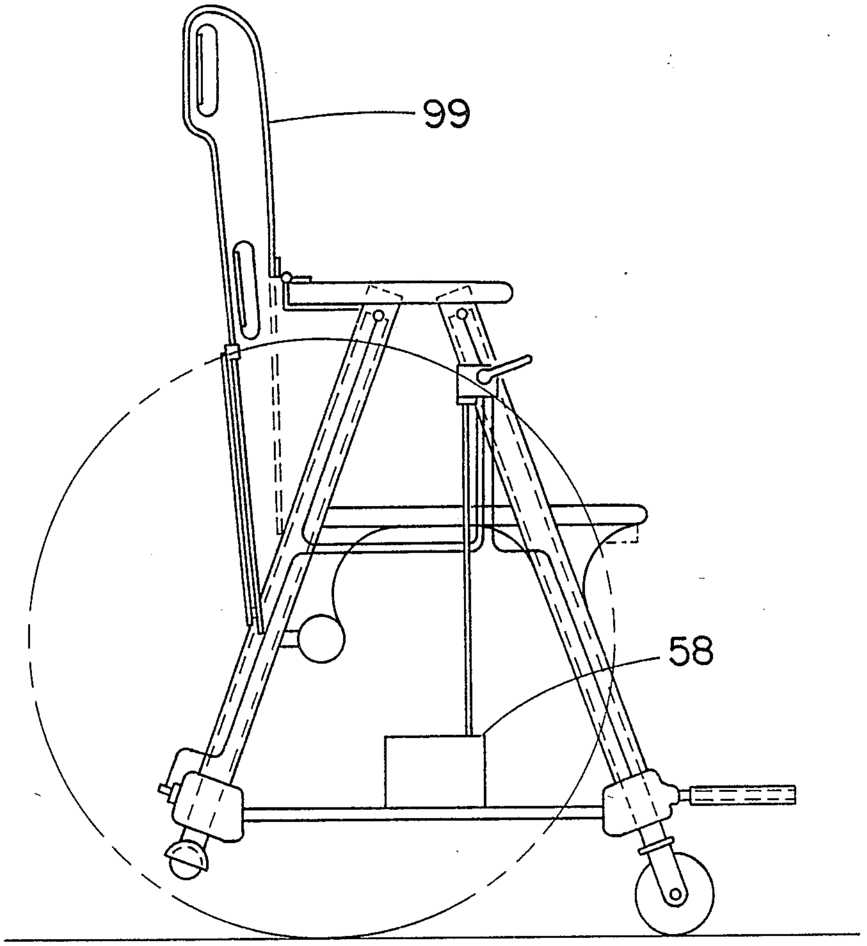
FIG. 16, is an elevation view of the wheel chair of the preferred embodiment showing an electric driven pump.

Referring to FIG. 16 there is shown the wheel chair 99 with an electric pump 58. The electric pump 58 would be used to supply the air pressure necessary to elevate the wheel chair 99. The electric pump 58 could be powered by a battery or an electric cord not shown, plugged into an outlet. The electric pump 58 could also be powered by an internal combustion engine with a generator; this would be a matter of design choice.

Figure 17:
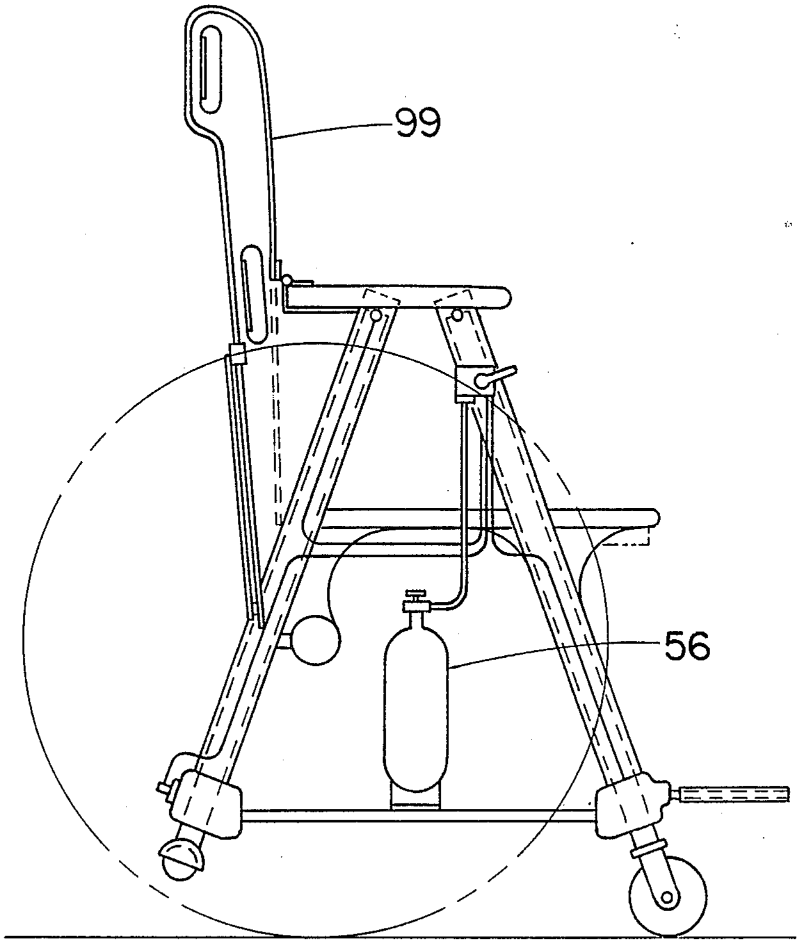
FIG. 17, is an elevation view of the wheel chair showing a pressure bottle.

Referring to FIG. 17 there is shown the wheel chair 99 with an accumulator 56 that is an air pressure bottle that holds air pressure for future work.

Although the system described in detail supra has been found to be most satisfactory and preferred, many variations in mechanics, structure and method are possible. For example, rollers could be used instead of balls, hydraulics could be used instead of pneumatics, electric motors with worm gears could be used to elevate the wheel chair rather than pneumatics. The folding wheel chair of the preferred embodiment could be a nonfolding wheel chair.

The above are exemplary of the possible changes or variations because many varying and different embodiments made within the scope of the inventive concept herein taught and because many modifications may be made in the embodiments herein detailed in accordance with the descriptive requirements of law, it should be understood that the details herein are to be interpreted as illustrative and not in a limiting sense.

I claim:

1. A wheel chair for transporting and supporting a disabled person on and above a floor and further elevating said wheel chair while said disabled person remains supported by said wheel chair comprising:

cylinders, each said cylinder with an uppermost end and a lowermost end;

said cylinders, wherein said cylinders are nearer to each other at their said uppermost end and wherein said cylinders are sloping away from each other to where they are further apart from each other at their said lowermost ends;

said cylinders, wherein said cylinders are further curved;

support members, wherein said support members are fixed to said cylinders, fixing said cylinders in a position relative to each other;

A frames, said A frames are formed by said cylinders and support members and wherein there are two said A frames and wherein each said A frame is disposed on each side of said wheel chair;

A seat, said seat is disposed between each of said A frames and said seat is further fixed to said support members;

leg means, said leg means with an upper end and a lower end, wherein said leg means are slideably disposed on the inside of said cylinders and wherein said upper end of said leg means forms on air tight connection between said inside of said cylinder and said upper end of said leg means and wherein said leg means telescopes in and out of said cylinder, said leg means are further curved to further conform to said curve of said cylinder, to allow said leg means to move inside of said cylinders;

a pump, said pump is disposed on said wheel chair;

tubes, said tubes essentially connecting said pump to said cylinders; wherein said pump is actuated by said disabled person while said disabled person is supported on said wheel chair, said pump thereby forms air under pressure into said tubes, and said air under pressure is conducted through said tubes and into said cylinders, thereby increasing the pressure within said cylinders which further reacts on said leg means actuating said leg means to further extend from said cylinder, thereby causing said wheel chair supporting said disabled person to elevate.

2. The wheel char of claim 1 wherein said cylinders form an A frame in a side elevation.

3. The wheel chair of claim 1 wherein said leg means have rollers fixed to their said lowermost ends.

4. The wheel chair of claim 1 wherein said leg means have wheels fixed to their said lowermost ends.

5. The wheel chair of claim 1 wherein said cylinders are actuated by hydraulic pressure.

6. The wheel chair of claim 1 wherein there is a spring disposed within each said cylinder between said uppermost end of said cylinder and said upper end of said leg means, thereby reacting on said uppermost end of said cylinder and said upper end of said leg means, thereby further actuating said leg means.

7. The wheel chair of claim 1 wherein said pump is a hand actuated pump.

8. The wheel chair of claim 1 wherein said pump is an electric driven pump.

9. The wheel chair of claim 1 wherein said pump is an accumulator containing air under pressure.

10. The wheel chair in accordance with claim 1 wherein said air pressure is transferred from said pump into said tubes and further into a manifold fixed to said tubes wherein said air pressure is divided by and manifold and further distributed by said manifold to said tubes and into said cylinders.

11. The wheel chair in accordance with claim 1 further including:

a backrest support connected to said cylinders;

a backrest connected to said backrest support;

an armrest;

a hinge, said hinge connecting said armrest to said backrest support, said hinge allowing said armrest to move up and down;

a pump said pump with a first end and a second end and wherein said pump is pivotably fixed to said armrest at said first end of said pump and said pump is further pivotably fixed to said wheel chair at said second end of said pump.

12. The wheel chair in accordance with claim 11 wherein vertical slots are cut into said backrest support, said vertical slot form a gripping means by which said wheel chair may be moved.

13. The wheel chair in accordance with claim 11 wherein said backrest support further includes an X brace that will stabilize said wheel chair while said wheel chair is open and will further allow said wheel chair to be folded together for storage, comprising:

a first bar member and a second bar member, each having a top end and a lower end, said first bar member is pinned to said second bar member at a point wherein said first bar member intersects said second bar member thereby allowing said first bar member and said second bar member to pivot relative to each other;

rail means fastened to said backrest support of said wheel chair;

gripped units slideably fastened to said rail means and further pivotally fastened to said top end of each said bar member;

said first bar member and said second bar member are further fastened to said rail means at the lower end of each said bar member.

14. A wheel chair for transporting and supporting a disabled person on and above a floor and further elevating said wheel chair while said disabled person remains supported by said wheel chair; comprising:

wheels;

cylinders, each said cylinder with an uppermost end and a lowermost end;

said cylinders are nearer to each other at their said uppermost ends and said cylinders are further apart from each other at their said lowermost ends;

support members, said support members are fixed to said cylinders, holding said cylinders in a position relative to each other;

A frames, said A frames are formed by said cylinders and support members, and wherein there are two said A frames and wherein each said A frame is deposed on each side of said wheel chair;

a seat, said seat is located between each of said A frames and said seat is fixed to said support members;

leg means said leg means with an upper end and a lower end wherein said leg means are slidably fixed to the inside of said cylinders and said leg means telescope in and out of said cylinders and said leg means further form an air tight connection between said upper end of said leg means with the inside of said cylinder; said wheels disposed at the lower end of said leg means;

a pump, said pump being fixed to said wheel chair;

tubes, said tubes essentially connecting said pump to said cylinders;

a first leg locking means connected to the said lowermost end of each of said cylinders wherein said leg locking means, locks said legs to said cylinders when said wheel chair is sloping, said first leg locking means is actuated by said sloping wheel chair;

a second leg locking means connected to said lowermost end of said cylinders wherein said second leg locking means locks said legs to said cylinders when said wheel chair is elevated to a desired position, said second leg locking means is actuated by a spring;

an elevation means, wherein said pump is actuated by said disabled while person said disabled person is supported on said wheel chair, said pump further forces air under pressure into said tubes wherein said air pressure is further forced into said cylinders wherein aid air pressure further forces said legs to telescope out of said cylinders, thereby causing said wheel chair to elevate;

splines, wherein said splines are fixed to said leg means and said splines extend from said upper end of said leg to said lower end of said leg;

guide means wherein said guide means is fixed to the lower end of said cylinder and said guide means slideably fits around said spline thereby preventing said leg from rotating.

15. The wheel chair in accordance with claim 14 wherein said legs within said cylinders are actuated with hydraulic means.

16. The wheel chair of claim 14 wherein there is a spring disposed within each said cylinder between said uppermost end of said cylinder and said upper end of said leg means, thereby reacting on said uppermost end of said cylinder and said upper end of said leg means, thereby further actuating said leg means.

17. The wheel chair of claim 14 wherein said pump is a hand actuated pump.

18. The wheel chair in accordance with claim 14 wherein said pump is actuated by an electric motor.

19. The wheel chair in accordance with claim 14 wherein said air pressure is supplied to said tubes and said cylinders from an accumulator.

20. The wheel chair in accordance with claim 14 wherein said air pressure is transfered from said pump into said tube and further into a manifold fixed to said tube wherein said air pressure is divided by said manifold and further distributed by said manifold to said tubes and into said cylinders.

21. The wheel chair of claim 14 wherein said wheel chair includes a backrest support, wherein said backrest support is fixed to said cylinders.

22. The wheel chair of claim 21 wherein vertical slots form a hand gripping means by which said wheel chair may be gripped and moved.

* * * * *